(12) United States Patent
Corigliano et al.

(10) Patent No.: US 8,095,334 B2
(45) Date of Patent: Jan. 10, 2012

(54) PROCEDURE FOR ESTIMATING THE TORQUE TRANSMITTED BY A FRICTION CLUTCH CONTROLLED BY AN ACTUATOR

(75) Inventors: Emanuel Corigliano, Orbassano (IT); Giancarlo Osella, Orbassano (IT); Attilio Porta, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 39 days.

(21) Appl. No.: 12/422,610

(22) Filed: Apr. 13, 2009

(65) Prior Publication Data

US 2009/0292510 A1     Nov. 26, 2009

(30) Foreign Application Priority Data

May 26, 2008   (EP) ..................................... 08425375

(51) Int. Cl.
    *G01P 3/00*     (2006.01)
(52) U.S. Cl. ...................................................... 702/145
(58) Field of Classification Search .................. 702/145; 701/51, 53; 318/9; 399/45
    See application file for complete search history.

(56) References Cited

U.S. PATENT DOCUMENTS

| | | | |
|---|---|---|---|
| 6,219,607 B1 * | 4/2001 | Piepenbrink et al. | 701/51 |
| 6,771,031 B1 | 8/2004 | Bai | |
| 2006/0287794 A1 * | 12/2006 | Gianoglio et al. | 701/53 |

FOREIGN PATENT DOCUMENTS

| | | |
|---|---|---|
| DE | 198 12 629 A1 | 9/1999 |
| EP | 0 856 677 A1 | 8/1998 |
| EP | 1 201 955 A1 | 5/2002 |

* cited by examiner

*Primary Examiner* — Drew A Dunn
*Assistant Examiner* — Xiuquin Sun
(74) *Attorney, Agent, or Firm* — Sughrue Mion, PLLC

(57) ABSTRACT

A process that estimates the torque transmitted by a friction clutch coupled to the shaft of a motor vehicle engine. The process includes determining the angular speed of the engine shaft and the torque developed by this shaft; calculating the difference between the measured value of the engine shaft's angular speed and an estimated value of the angular speed; and determining an estimated value of the torque transmitted by the clutch, corresponding to the calculated value of the difference or error in the engine shaft angular speed. The estimated value of the torque is used, along with the value measured or otherwise determined of the torque developed by the engine shaft, to obtain the estimated value of the angular speed of the engine shaft on the basis of a predetermined mathematical model.

3 Claims, 2 Drawing Sheets

PROCEDURE FOR ESTIMATING THE TORQUE TRANSMITTED BY A FRICTION CLUTCH CONTROLLED BY AN ACTUATOR

BACKGROUND OF THE INVENTION

This invention relates to a procedure for estimating the torque transmitted by a friction clutch.

More specifically, the subject of the invention is a procedure for estimating the torque transmitted by a friction clutch coupled to a motor-vehicle engine shaft and controlled by an actuator.

The information in a motor vehicle regarding the magnitude of the torque transmitted by such a friction clutch is useful for a multiplicity of purposes, for example for correcting or updating a "transmissibility map" of the actuator associated with the clutch in a motor vehicle equipped with a gearbox of the "robotized" type. The transmissibility map of the actuator essentially makes every value of an actuator control variable (for example the intensity of the excitation current) correspond with a corresponding predetermined value of the torque transmitted by the clutch.

In a motor vehicle equipped with a gearbox of the robotized type, the actuator associated with the friction clutch is controlled by algorithms which manage the starting or pickup stage as well as the shifting stages, optimizing the performance of the motor vehicle and/or driving comfort, depending on the user's preferences. These algorithms typically use the transmissibility map of the complex formed by the clutch and by the associated actuator. Moreover, the characteristics of the actuator and of the clutch may change over time, even considerably, following wear and as an effect of the working conditions.

In order to guarantee the maintenance of the performance and/or driving comfort, it is necessary for the control algorithms to be enabled to correct or update the characteristics of the clutch/actuator complex in the course of its working life. For this purpose it is necessary to be able to precisely and rapidly estimate the torque transmitted by the friction clutch in what are known as the torque modulation stages, i.e. starting from the information available on board the motor vehicle, in order then to be able to correct the transmissibility map on the basis of this estimate.

One object of the present invention is therefore to make available a procedure which makes it possible to obtain an estimate of the torque transmitted by a friction clutch with good precision, high estimating speed, and robustness vis-à-vis the uncertainties about the data used, and a good level of rejection of the disturbances and noise which typically afflict the magnitudes measured.

SUMMARY OF THE INVENTION

This and other objects are realized according to the invention using a procedure which comprises the operations of:
  measuring or otherwise determining the angular speed of the engine shaft and the torque transmitted by this shaft;
  calculating the difference or error between the measured value of the engine shaft's angular speed and an estimated value of the said angular speed;
  using an electronic controller, determining an estimated value of the torque transmitted by the clutch, corresponding to the calculated value of the said difference or error in the engine shaft angular speed; the estimated value of the torque transmitted by the clutch being used, along with the value measured or otherwise determined of the torque developed by the engine shaft, to obtain the aforesaid estimated value of the angular speed of the engine shaft on the basis of a predetermined mathematical model.

BRIEF DESCRIPTION OF THE DRAWINGS

Further characteristics and advantages of the invention will become apparent from the detailed description which follows, and which is purely exemplificative and not limitative, with reference to the attached drawings, in which.

DETAILED DESCRIPTION OF THE INVENTION

The physical magnitudes taken into consideration in this procedure or method will now be defined before proceeding with the description of the ways of implementing the procedure or method according to the invention. These magnitudes are essentially the following:

$\omega_{E,meas}$: angular speed of the internal combustion engine shaft, measured by means of a known sensor (for example the "phonic wheel" type) or determined in some other way, for example by means of algorithms known per se;

$\hat{\omega}_E$: estimated value of the angular speed of the engine shaft;

$\hat{C}_{FC}$: estimated value of the torque transmitted by the friction clutch;

$C_E$: measured or otherwise determined value of the torque transmitted by the engine shaft;

$C_{EF}$: term for the reduction of the torque transmitted by the engine shaft as an effect of the friction of the engine itself;

$C_{FC}$: value of the torque transmitted by the clutch, deduced from the transmissibility characteristic or map, in relation to an instantaneous value of the control variable of the actuator associated with the friction clutch;

$\Delta\hat{C}_{FC}$: estimated value of the variation of the torque transmitted by the friction clutch; and $I_E$: rotational inertia of the engine.

Figure 1:
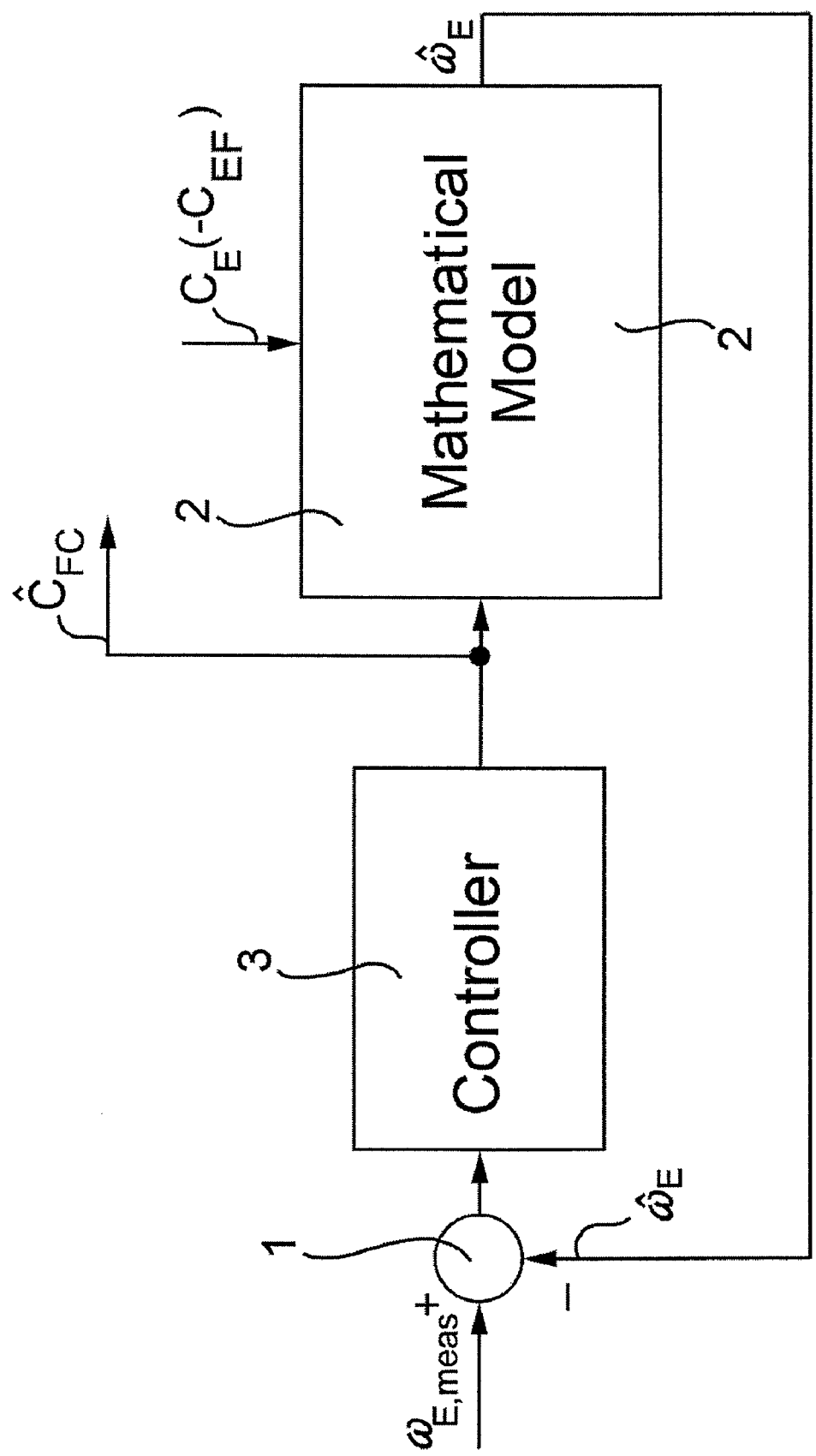
FIG. 1 is an illustrative block diagram of a procedure for estimating the torque transmitted by a friction clutch according to the present invention.

With reference to FIG. 1, in a first manner of implementation, a procedure or method according to the invention comprises the measurement (or other means of determination known per se) of the angular speed $\omega_{E,meas}$ of the engine shaft, and of the torque $C_E$ developed by this shaft. This torque generated by the engine shaft is intended as net of the resistant torque $C_{EF}$ due to the friction inside the engine.

With reference to the plan in FIG. 1, an estimated value $\hat{\omega}_E$ of the angular speed of the shaft, obtained on the basis of a mathematical model 2, in an algebraic sum node 1, is subtracted from the measured value $\omega_{E,meas}$ of this angular speed, as will be described below.

The difference or "error" of the engine shaft angular speed is therefore available at the exit of the nodes. This difference or error constitutes the input of a controller block 3, the output of which is an estimated corresponding value $\hat{C}_{FC}$ of the torque transmitted by the friction clutch.

The characteristic of the controller 3 is designed on the basis of the characteristics of the specific vehicle on which the procedure or method for estimating the torque transmitted by the friction clutch is to be used. The transfer function of this controller is conveniently designed in such as way as to guarantee the frequency band requested by the specifications, making a reasonable compromise between the estimating speed and the ability to reject disturbances that afflict the values of the input parameters measured or otherwise obtained.

As well as making the estimated value $\hat{C}_{FC}$ of the torque transmitted by the clutch available as a variable output magnitude, the controller 3 also provides this value to the input of the block 2 where this value, jointly with the value measured or otherwise determined for the torque $C_E$ developed by the engine, is used to obtain the estimated value $\hat{\omega}_E$ of the angular speed of the engine shaft.

The block 2 makes it possible to reconstruct or estimate the angular speed of the engine shaft on the basis of a functional relationship which correlates the angular acceleration $d\hat{\omega}_E$ of the engine shaft with the balance or difference between the torque $C_E$ applied to the friction clutch and the torque $C_{FC}$ transmitted by this clutch. A simplified example of this functional relationship is:

$$I_E * (d\hat{\omega}_E/dt) = C_E - C_{FC}$$

The relationship or differential equation given above makes it possible to determine the value of $\hat{\omega}_E$ in quite a straightforward manner.

Figure 2:
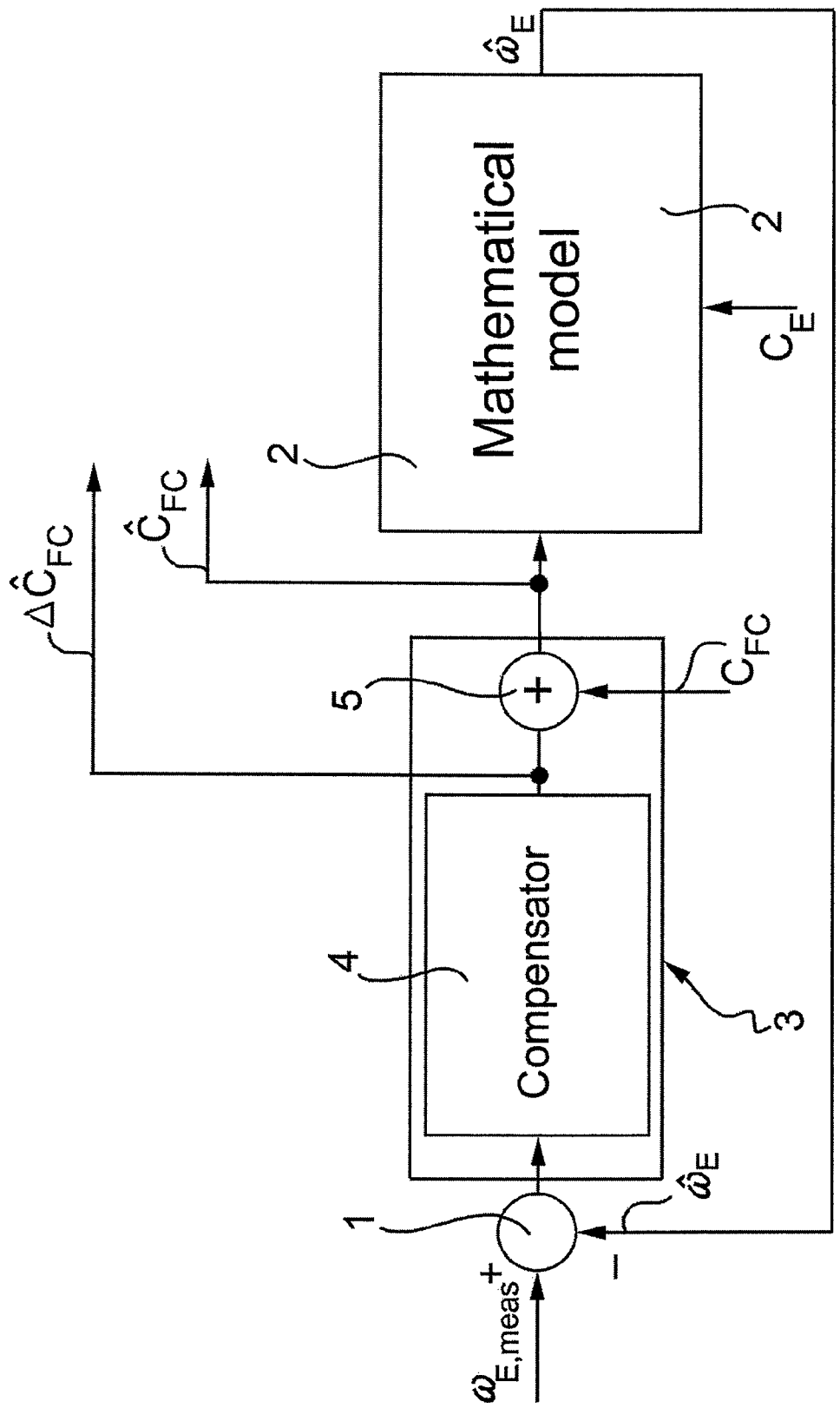
FIG. 2 is an explanatory block diagram of a variant for implementing the procedure according to the invention.

FIG. 2 of the attached drawings schematically shows the structure of an estimator of the effective value $\hat{C}_{FC}$ of the torque transmitted by the friction clutch, in a variant of implementation of the method according to the invention. The same reference numbers previously used have been attributed once again in this figure to the parts and elements already described.

In the manner of implementation according to FIG. 2, the controller 3 comprises a compensator 4 which receives the engine shaft angular speed error as an input and, as outputs, supplies the deviation or difference $\Delta\hat{C}_{FC}$ between the torque transmitted by the friction clutch and the value $C_{FC}$ of this torque deduced from the transmissibility characteristic or map in correspondence with the instantaneous value of the control variable of the actuator associated with the friction clutch.

The transfer function of the compensator 4 can be predetermined experimentally on the basis of the characteristics of the motor vehicle in which the procedure for estimating the torque transmitted by the friction clutch is to be used.

The output of the compensator 4 is connected to the input of another adder 5, where the estimated value of the variation of the transmitted torque $\Delta\hat{C}_{FC}$ is added to the transmitted torque value $C_{FC}$ corresponding to the instantaneous value of the actuator's control variable. Therefore the estimated value $\hat{C}_{FC}$ of the torque transmitted by the friction clutch is obtained at the output of the adder 5 and this is supplied at the input of block 2, with a view to the calculation of the engine shaft angular speed.

Compared with the plan in FIG. 1, the estimator shown schematically in FIG. 2 envisages the open-loop contribution of the value $C_{FC}$ of the torque transmitted by the friction clutch deduced by the transmissibility map.

The estimator according to FIG. 2 permits the elimination, from the output magnitude $\Delta\hat{C}_{FC}$, of the noise present in the transmitted torque value deduced from the transmissibility characteristic.

A further benefit of the estimator shown in FIG. 2 consists of the initialization of the estimate of $C_{FC}$ with the torque value deduced from the transmissibility map: if the estimate of the torque transmitted by the clutch is enabled when the latter is already in the transmitted torque modulation stage, an estimator without the open-loop contribution of $C_{FC}$ initially estimates a zero torque, and the initial torque difference (between the estimated torque and the torque deduced from the transmissibility map) would be erroneously interpreted as a transmissibility map error.

The estimate of the torque transmitted by the friction clutch obtained with the estimator according to FIG. 2 is found to be faster and therefore it is possible to reduce the frequency band of the estimator, obtaining greater rejection of the disturbances present in the measured magnitudes that are used by the estimator.

Naturally, without prejudice to the principle of the invention, the forms of implementation and the embodiment details can be widely varied compared with what has been described and illustrated for non-limiting exemplificative purposes only, without thereby leaving the framework of the invention as defined in the appended claims.

What is claimed is:

1. A procedure for estimating the torque $\hat{C}_{FC}$ transmitted by a friction clutch coupled to the shaft of a motor vehicle engine and controlled by means of an actuator, the procedure comprising the operations of:
   measuring or otherwise determining the angular speed of the engine shaft $\omega_{E,meas}$ and the torque developed by this shaft $C_E$;
   calculating the difference or error between the measured value of the engine shaft's angular speed $\omega_{E,meas}$ and an estimated value of the angular speed $\hat{\omega}_E$; and,
   using an electronic controller, determining an estimated value of the torque transmitted by the clutch $\hat{C}_{FC}$, corresponding to the calculated value of the difference or error in the engine shaft angular speed; the estimated value of the torque transmitted by the clutch $\hat{C}_{FC}$ being used, along with the value measured or otherwise determined of the torque developed by the engine shaft $C_E$, to obtain the estimated value of the angular speed of the engine shaft $\hat{\omega}_E$ on the basis of a predetermined mathematical model.

2. A procedure according to claim 1, in which a transmissibility characteristic is predefined for a complex formed by the clutch and by the actuator and associates corresponding predetermined values of the torque transmitted by the clutch $C_{FC}$ with values of an actuator control variable; the procedure also comprising the operations of:
   determining, by means of a compensator, an estimate of the deviation of the torque transmitted by the friction clutch $\Delta\hat{C}_{FC}$ compared with the value reconstructed by a transmissibility map of the actuator, employing the engine shaft angular speed difference or error; and
   calculating the estimated value of the torque transmitted by the clutch by adding the estimated value of the variation or deviation of the transmitted torque $\Delta\hat{C}_{FC}$ to the transmitted torque value $C_{FC}$ corresponding to an instantaneous value of the actuator control variable.

3. A procedure according to claim 1, in which the mathematical model of the complex composed of the clutch and associated actuator is based on a functional relationship which correlates the angular acceleration ($d\omega/dt$) of the engine shaft with the balance or difference between the torque applied to the clutch and the torque transmitted by the clutch.

* * * * *